(12) United States Patent
Kiso

(10) Patent No.: US 7,423,671 B2
(45) Date of Patent: Sep. 9, 2008

(54) IMAGE PICKUP APPARATUS AND PHOTOGRAPHING METHOD WITH IMAGE ANGLE CORRECTION FOR COMBINING IMAGE DATA

(75) Inventor: Toshiya Kiso, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 652 days.

(21) Appl. No.: 10/500,436

(22) PCT Filed: Oct. 23, 2003

(86) PCT No.: PCT/JP03/13575

§ 371 (c)(1),
(2), (4) Date: Jun. 28, 2004

(87) PCT Pub. No.: WO2004/040901

PCT Pub. Date: May 13, 2004

(65) Prior Publication Data

US 2005/0078202 A1  Apr. 14, 2005

(30) Foreign Application Priority Data

Oct. 31, 2002  (JP)  ............................. 2002-318530

(51) Int. Cl.
  *H04N 5/225*  (2006.01)
  *H04N 7/00*  (2006.01)
  *H04N 5/262*  (2006.01)
  *H04N 1/46*  (2006.01)
  *H04N 1/387*  (2006.01)
  *G06K 9/32*  (2006.01)

(52) U.S. Cl. ...................... 348/218.1; 348/36; 348/239; 358/540; 358/450; 382/294

(58) Field of Classification Search ................. 348/239, 348/36, 39, 218.1, 208.6; 358/540, 450; 382/294, 296

See application file for complete search history.

(56) References Cited

U.S. PATENT DOCUMENTS

| 5,262,867 A | * | 11/1993 | Kojima ......................... 348/39 |
| 6,304,284 B1 | * | 10/2001 | Dunton et al. ................. 348/36 |
| 6,313,923 B1 | | 11/2001 | Takanashi et al. |
| 6,389,179 B1 | * | 5/2002 | Katayama et al. .............. 348/36 |
| 6,396,960 B1 | | 5/2002 | Yoshimura |
| 6,661,455 B1 | * | 12/2003 | Toyofuku et al. ......... 348/218.1 |
| 6,873,357 B2 | * | 3/2005 | Fuchimukai et al. ..... 348/208.2 |

(Continued)

FOREIGN PATENT DOCUMENTS

EP  0 456 414 A2  11/1991

(Continued)

*Primary Examiner*—John M. Villecco
(74) *Attorney, Agent, or Firm*—Frishauf, Holtz, Goodman & Chick, P.C.

(57) ABSTRACT

Two sets of image data are combined into one set of image data producing no unnatural feeling with a simple procedure. A direction for each set of image data is designated on a touch panel (26). The directions of the image data are compared, and a tilt of one of the sets of image data is adjusted relative to the other set of image data based on the result of the comparison. The adjusted image data and the other image data are combined into one set of image data producing a natural feeling.

8 Claims, 9 Drawing Sheets

U.S. PATENT DOCUMENTS

| | | | |
|---|---|---|---|
| 7,221,395 B2 * | 5/2007 | Kinjo | 348/239 |
| 7,305,146 B2 * | 12/2007 | Cheatle | 382/296 |
| 7,366,360 B2 * | 4/2008 | Takiguchi et al. | 348/36 |
| 2001/0000126 A1 | 4/2001 | Kinjo | |
| 2001/0045986 A1 | 11/2001 | Edwards et al. | |
| 2003/0152291 A1 * | 8/2003 | Cheatle | 382/296 |

FOREIGN PATENT DOCUMENTS

| | | |
|---|---|---|
| EP | 0 810 776 A2 | 12/1997 |
| EP | 1026877 A2 * | 8/2000 |
| JP | 8-65457 A | 3/1996 |
| JP | 9-322055 A | 12/1997 |
| JP | 11-136575 A | 5/1999 |
| JP | 2001-169151 A | 6/2001 |
| JP | 2001-245131 A | 9/2001 |
| JP | 2001-1245131 A | 9/2001 |
| JP | 2002-042125 A | 2/2002 |
| JP | 2002-057879 A | 2/2002 |

* cited by examiner

IMAGE PICKUP APPARATUS AND PHOTOGRAPHING METHOD WITH IMAGE ANGLE CORRECTION FOR COMBINING IMAGE DATA This application is a U.S. National Phase Application under 35 U.S.C. 371 of International Application PCT/JP03/13575 filed Oct. 23, 2003.

TECHNICAL FIELD

The present invention relates to an image pickup apparatus, a photographing method, and a storage medium recording the photographing method.

BACKGROUND ART

Image data obtained or to be obtained with a digital still camera is different from a photograph taken with a conventional silver-film camera. Various digital image processes may be applied to the image data of the digital still camera.

For example, according to one of the digital image processes, or one of the functions of the digital still camera, the image data obtained with the digital still camera is processed as follows. A first photograph of a fixed subject A and a person B is taken with a picture composition which includes the fixed subject A at the center of a frame FL and the person B at a right side of the frame FL, as shown in FIG. 9A.

A second photograph of subjects C and A is taken with a picture composition similar to the first photograph, which includes the subject C at the left side of the frame FL as shown in FIG. 9B.

When the second photograph is taken, the image of the first photograph is displayed on a liquid crystal display panel of the digital camera, more specifically, the image of the fixed subject A and the person B in the first photograph shown in FIG. 9A is displayed in a right two-thirds area of the frame FL of the liquid crystal display panel in a semi-transparent state. Therefore, if the second photograph is taken with the current subject A overlapping precisely with the subject A of the first photograph, second image data shown in FIG. 9B is obtained, which is used to be combined with the first image data shown in FIG. 9A, providing image data as shown in FIG. 9C. The combination of the first and the second image data obtained as set forth above produces a resultant image data, which shows the subjects A and C, as if they are photographed together although actually they are photographed separately.

Since the digital camera has the image composing function set forth above, image data of two persons B and C shown in FIG. 9C may be obtained by photographing the persons B and C separately and combining the separately obtained image data of the persons B and C without using a tripod and a self timer function or without asking other person to take their picture.

To obtain the same image quality as the first photograph, the second photograph must be taken under substantially the same photographing conditions for the first photograph, such as the zoom position of a zoom lens, exposure conditions including focus and shutter speed, white balance, and flash setting.

In the above mentioned image composing procedure, two sets of image data are combined, but an arbitrary number of sets of image data may be combined in a similar manner.

Regarding the image composing technique, there has been proposed a technique of combining image data and other image data including a series of characters, in which a tilt of the characters are corrected prior to be combined with the former image data. (Refer to Japanese laid-open patent application No. H8-065457)

Further, another image composing technique has been proposed, in which image data captured with plural cameras installed on a moving body and the image data are corrected based on angles and a movement detected from the moving body prior to being subjected to the combination process. (Refer to Japanese laid-open patent application No. 2001-245131)

However, in the conventional technique described with reference to FIGS. 9A, 9B, 9C and 9D, image data are acquired with an unfixed camera separately by separate persons, and therefore the image data can be acquired with a slightly changed camera angle. If these image data are combined, the resultant image data will produce an unnatural feeling compared with image data which is obtained by photographing two persons together.

FIG. 9D is a view showing a sample of the combined image data, in which the subject C of the second image data has a tilt to the left compared with the subjects A and B in the first image data. This is caused by the tilted camera angle of the camera at which the second photograph is taken.

The technique disclosed in Japanese laid-open patent application No. H8-065457 can not be used for the correcting the camera angle, because this technique is for correcting the tile of the series of characters.

The technique disclosed in Japanese laid-open patent application No. 2001-245131 is for detecting a tilt of a camera using a gyroscope to compose image data and may be used for a moving body such as an automobile and a train, but it is not practical to use the technique for a compact device such as a digital camera and a cellular phone.

DISCLOSURE OF INVENTION

According one aspect of the invention, there is provided an image pickup apparatus which is provided with storage for storing first image data and second image data obtained respectively in a first photographing operation and a second photographing operation, a first direction-designating unit for designating a direction for the first image data stored in the storage, a second direction-designating unit for designating a direction for the second image data stored in the storage, a direction-comparing unit for comparing the directions designated respectively for the first image data and the second image data by the first and the second direction-designating unit, an image-angle correcting unit for adjusting a tilt of either of the first and the second image data depending on a result of the comparison made by the direction-comparing unit so that the direction of the adjusted image data coincides with the direction of the other image data, and an image composing unit for combining the image data adjusted by the image-angle correcting unit and the other image data.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles and the scope of the invention.

Best Mode for Carrying Out the Invention

First Embodiment of the Invention

A digital still camera (hereafter, "digital camera") according to a first embodiment of the present invention will be described with reference to the accompanying drawings.

Figure 1:
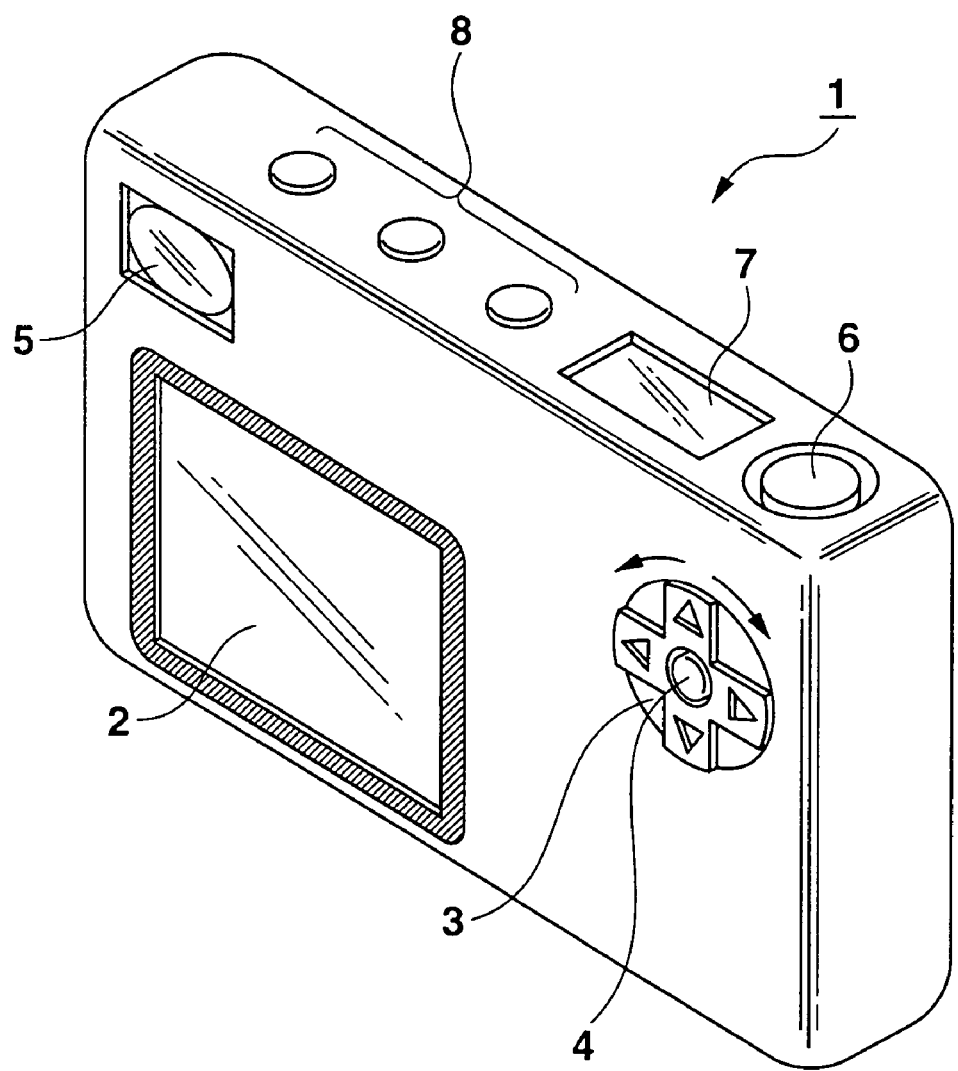
FIG. 1 is a view illustrating a perspective external view of a digital still camera according to a first embodiment of the invention.

FIG. 1 is a view illustrating an external perspective view of the digital camera 1 as seen from its rear side. The digital camera 1 is provided with a monitoring display unit 2, a cross key 3, a decision key 4 and an optical viewfinder 5 on its rear face, as shown in FIG. 1.

The monitoring display unit 2 comprises a liquid crystal display panel with a back light, and has a function as an electronic viewfinder for monitoring an image to be photographed in a photographing mode, and a function as a display for reproducing a recorded and selected image data in a reproducing mode.

Further the monitoring display unit 2 has a function as a touch panel for obtaining a position coordinates representing a position where a user touches with his/her finger and is also used to give various instructions with respect to the image displayed thereon.

The cross key 3 comprises a key unit, in which an upward-direction key, a downward-direction key, a leftward-direction key and a rightward-direction key are integrally combined, and has the decision key 4 at the center portion. The cross key 3 is used to select and/or update various items and the decision key is manipulated to finally decide to perform the item selected with the cross key 3.

The optical viewfinder 5 is used to visually confirm an image of a subject and a picture composition without using the monitoring display unit 2.

On the top of the digital camera 1, there are provided a shutter key 6 at the right side of the top face, a guide panel 7 and various mode keys 8.

When the shutter key 6 is manipulated or depressed at a timing of photographing the subject, a picture of the subject is taken following an Auto Focus process and Auto Exposure process.

The guide panel 7 is a segment type of liquid crystal display panel, on which a currently selected photographing item, a battery level and a remaining memory amount, etc., are displayed.

The mode keys 8 are not only used to set or switch an operation mode to the photographing mode or the reproducing mode, but also used to select a couple photographing mode (as will be described hereafter) in the photographing mode.

Though not shown in the drawings, the digital camera 1 is provided with a lens barrel, a flash system, an optical finder window, a self-timer indicator, etc., on its front face.

Now, referring to FIG. 2, an electronic circuit configuration built into the digital camera 1 will be described.

In the digital camera 1, the photographing mode and the reproducing mode are alternatively set as the operation mode of the digital camera 1. In the digital camera 1, an optical lens system 12 is driven by a motor (M) 11 to focus the camera lens and set the proper exposure. A solid-state imaging device or CCD 13 is arranged along the optical axis of the optical lens system 12, and is scanned by a timing signal generator (TG) 14 and a vertical driver 15 in a monitoring state of the photographing mode. CCD 13 generates a frame of photoelectric transferred data corresponding to an optical image focused every constant period.

The photoelectric transferred data (analog signal) with each of R, G, B color components subjected a gain control process is transferred to a sample-and-hold (S/H) circuit 16 to be sample-held, and further to an analog-to-digital converter 17, where the data is converted into digital data. Then the digital data is supplied to a color processing circuit 18, where the digital data is subjected to a color process including a pixel interpolation process and the gamma correction process to generate a digital luminance signal Y and color-difference signals Cb, Cr.

A direct memory access controller (DMA controller) 19 receives the digital luminance signal Y and the color-difference signals Cb, Cr, from the color processing circuit 18, and temporarily stores the received signals in a built-in buffer by using a composite sync signal from the color processing circuit 18, an enable signal for enabling to write into a memory, and a clock signal, and further DMA-transfers the signals through DRAM interface (I/F) 20 to DRAM 21, which is used as a buffer memory. DRAM 21 stores image data that are obtained during the photographing operation performed twice.

A control unit 22 controls the whole operation of the digital camera 1 and includes CPU 221, ROM 222 for storing an operation program, RAM 223 used as a work memory, a direction comparing unit 224 for comparing designated directions, an image angle correction unit 225 for correcting an angle of one of a first image data and a second image data, an image composing unit 226 for combining the corrected image data and the other image data, and an image designating unit 227 for designating either of the first and the second image data. The control unit 22 reads out the luminance signal and the color-difference signals from DRAM 21 through DRAM interface 20 and writes the luminance signal and the color-difference signal into VRAM 24 through VRAM controller 23.

A digital video encoder 25 reads out the luminance signal and the color-difference signals from VRAM 24 through VRAM controller 23 at fixed intervals, and generates a video signal based on these read out signals to display on the monitoring display unit 2.

The monitoring display unit 2 displays the video signal supplied from the digital video encoder 25 in order to display an image based on image data which is obtained by CCD 13 at the time and sent through the VRAM controller 23.

The monitoring display unit 2 is integrally provided with a transparent touch panel 26 on the top surface. The transparent touch panel 26 serves as a first direction designating unit and a second direction designating unit. A touch panel controller 27 detects a manipulation made on the touch panel 26, and outputs to the control unit 22 position-coordinate data representing a position on the touch panel 27 where a user touches.

When the shutter key 6 among the plural keys included in a key input unit 28 is manipulated at a timing of taking a picture with the monitoring display unit 2 displaying an image as a monitor image at the time, a trigger signal is generated.

In response to the trigger signal, the control unit 22 DMA-transfers to DRAM 21 the luminance signal and the color-difference signals both for one frame which have been taken in from CCD 13 at the time, and then immediately closes a route between CCD 13 and DRAM 21 bringing DRAM 21 into a storing state to keep data therein.

The control unit 22 reads out through DRAM interface 20 the luminance signal and the color-difference signals for one frame in unit of a fundamental block of 8 pixels in a vertical direction and 8 pixels in a horizontal direction with respect to each of the components Y, Cb and Cr, and writes these read out data onto JPEG (Joint Photographic Experts Group) circuit 29, where these data are subjected to procedures such as ADCT (Adaptive Discrete Cosine Transform) and Entropy coding or Huffman coding for data compression.

The control unit 22 reads out code data forming one frame data file from JPEG circuit 29, and writes the code data onto memory card 30. The memory card 30 is a detachable non-volatile recording-medium including a flash memory.

When the luminance signal and the color-difference signals for one frame have been subjected to the compression process and the compressed data has been written onto the memory card 30, the control unit 22 opens the route between CCD 13 and DRAM 21, again.

The key input unit 28 comprises the cross key 3, the decision key 4, mode keys 8 in addition to the shutter key 6, and a signal generated in response to the manipulation of these keys is directly sent to the control unit 22.

Now, an operation of the first embodiment set forth above will be described hereafter.

Figure 3:
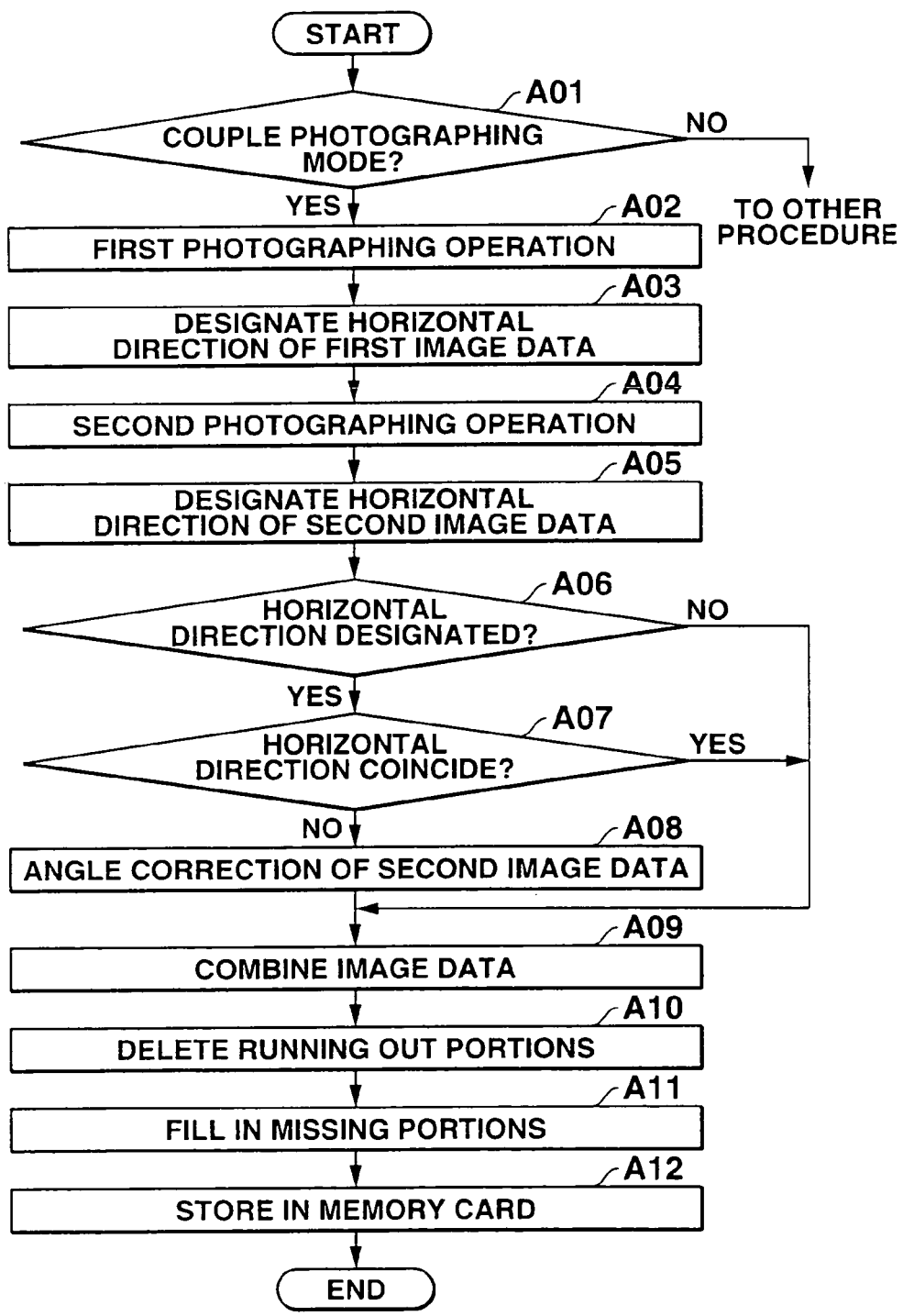
FIG. 3 is a flowchart showing a procedure in a couple photographing mode in the first embodiment.

FIG. 3 is a flowchart illustrating a procedure to be performed in the photographing mode, especially in the couple photographing mode. At Step A01, it is judged whether the couple photographing mode has been set or not. If not, other photographing procedure is performed.

When it is determined at Step A01 that the couple photographing mode has been set, the first photographing operation is performed at Step A02. Image data (first image data) obtained during the first photographing operation is stored in DRAM 21. The first image data stored in the DRAM 21 is displayed on the monitoring display unit 2.

Figure 4A:
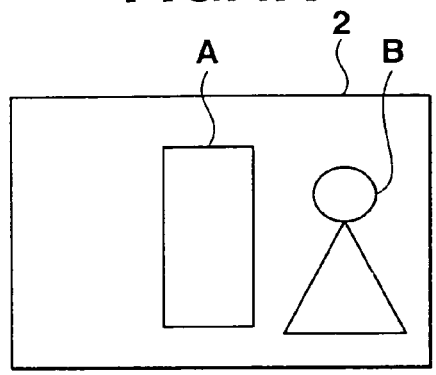
FIGS. 4A, 4B, 4C, 4D, 4E and 4F are views illustrating by way of example images displayed on a display screen in the couple photographing mode in the first embodiment.
Figure 9A:
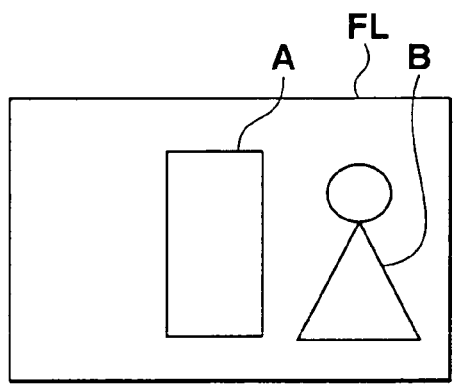
FIGS. 9A, 9B, 9C and 9D are views illustrating an example of a conventional image combining function.
Figure 9B:
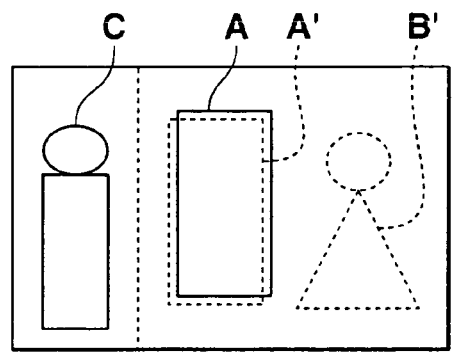
Figure 9C:
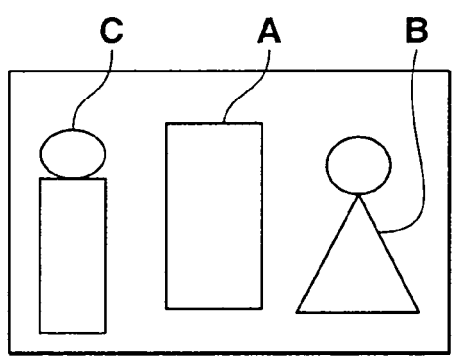
Figure 9D:
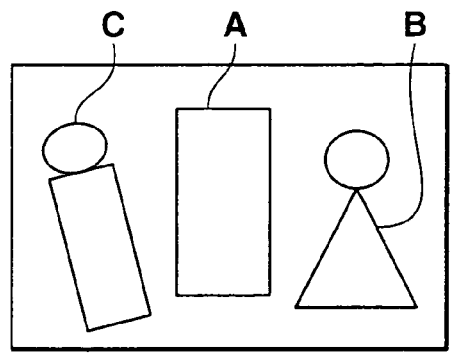

FIG. 4A is a view illustrating by way of example images displayed based on the first image data obtained during the first photographing operation on the monitoring display unit 2. More specifically, an image of a fixed subject "A" is displayed at the center of the display screen on the monitoring display unit 2, and an image of a person or a subject "B" is displayed on the right side of the display screen in the similar manner as shown in FIG. 9A.

To prompt the user to designate the horizontal direction of the image displayed on the monitoring display unit 2, a message saying, for example, "Designate the horizontal direction of the image" is displayed over the images displayed on the display screen in an overlapping manner. It may be possible to display a blinking arrow provisionally representing the horizontal direction of the image over the displayed image.

At Step A03 the user draws a line on the touch panel 26 with his/her finger to designate the horizontal direction of the image with the first image data displayed on the monitoring display unit 2. The information representing the designated horizontal direction of the image is associated with the first image data obtained during the first photographing operation and stored in DRAM 21.

Figure 4B:
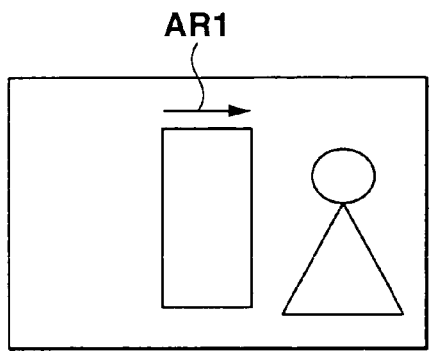

As shown in FIG. 4B, a solid arrow AR1 representing the horizontal direction of the image in the designated direction over the image.

Figure 4C:
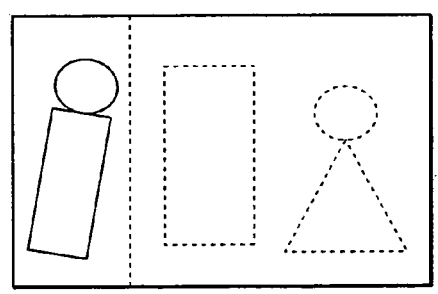

Then, the second photographing operation is performed at Step A04. Since the first image data obtained during the first photographing operation is displayed in a semi-transparent state in a two third area on the right side of the display screen as shown in FIG. 4C, the second photographing operation is performed such that the real image of a subject and the semi-transparent image of the subject are overlapped.

The image data (second image data) obtained in the second photographing operation is store in a different memory area in DRAM 21 from the memory area where the first image data obtained in the first photographing operation has been stored, and the image data stored in DRAM 21 are displayed on the monitoring display unit 2.

While only the second image data obtained in the second photographing operation is displayed, for example, in a one third area on the left side of the display screen of the monitoring display unit 2, the user designates the horizontal direction of the displayed image on the touch panel 26 at Step A05. The information representing the designated horizontal direction of the image is associated with the second image data obtained in the second photographing operation, and is stored in DRAM 2.

Figure 4D:
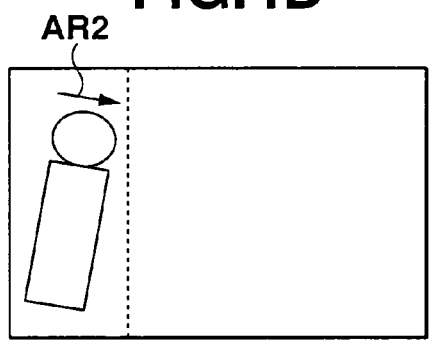

As shown in FIG. 4D, a solid arrow AR2 representing the designated horizontal direction of the image is displayed in the designated direction on the monitoring display unit 2.

Then, it is judged at Step A06 whether or not the information is associated with the image data stored in DRAM 21 to determine whether or not the horizontal directions of the images have been designated with respect to the two image data obtained in the two photographing operations respectively.

Only when it is determined that the horizontal directions of the images have been designated, it is judged at Step A07 whether or not the two horizontal directions of the images coincide with each other to determine whether angles of the images should be corrected or not.

When it is determined at Step A07 that the two horizontal directions of the images do not coincide with each other and that the angle of the image or a tilt of the image relative to the other image should be corrected, the angle correction procedure is performed at Step A08, where the second image data obtained in the second photographing operation is rotated so as to make the horizontal direction of the second image meet with the first image, and then both the image data are combined at step A09.

If the combined image data runs out of the frame of the image data, the portion running out of the frame is deleted at step A010. On the contrary, if the combined image data can not fill in the frame of the image data, the combined image data is subjected to a correction procedure at Step A11 to fill in the missing space with neighbor portion of the image data.

Figure 5:
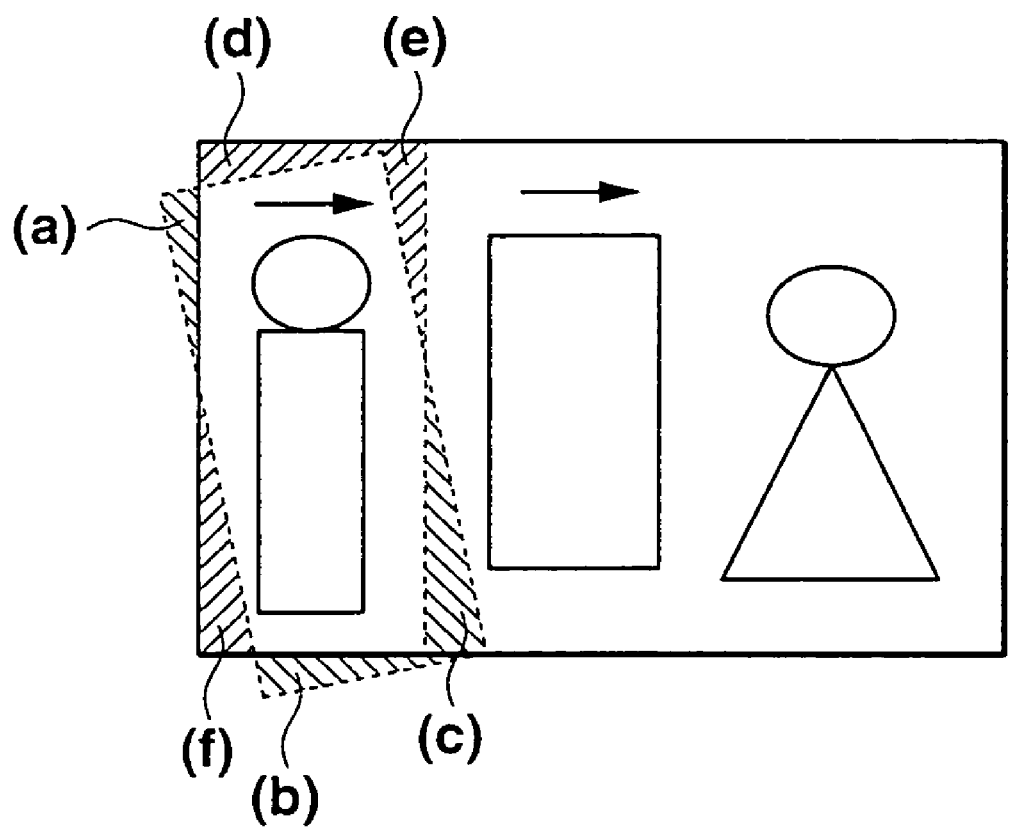
FIG. 5 is a view illustrating a combined image in the couple photographing mode in the first embodiment.

FIG. 5 is a view illustrating the first image data obtained in the first photographing mode, which is to be combined with the second image data obtained in the second photographing mode shown in FIG. 4D, the horizontal direction of which is amended so as to meet with the horizontal direction of the other image data. The portion running out of the frame and the missing portion, which generate in the angle correction procedure at Step A08 can be seen in FIG. 5. As described above, the hatched portions running out of the frame (a), (b) and (c) are deleted at Step A10, and the missing portions (d), (e) and (f) are filled in at Step A11.

The combined image data resulted from the above mention amendments is compressed in the JPEG circuit 29, and stored in the memory card 30 at Step A12. Then, the photographing procedure in the couple photographing mode finishes.

As described above, two image data, the horizontal directions of which are different from each other can be combined into one image data giving no special unnatural feeling to a viewer by a simple manipulation performed on the touch panel 26 integrally combined with the monitoring display unit 2 by the user to designate the horizontal direction of the image with his/her finger.

Modified First Embodiment of the Invention

A digital camera according to the modified first embodiment of the invention will be described. In the digital camera, the horizontal direction of an image is not designated on the touch panel 26 by the user with his/her finger but designated with an angle sensor.

The external view of the digital camera of the modified first embodiment is the same as the first embodiment shown in FIG. 1. The digital camera has the angle sensor in addition to those circuit elements illustrated in FIG. 2.

Now, an operation of the digital camera will be described, but further description of the similar processes as shown in the flowchart of FIG. 3 are omitted.

After a first picture has been taken in the couple photographing mode, the angle sensor detects at Step A03 the angle of the digital camera 1 used to take the first picture. Information representing the detected camera angle, which is used as indicating the horizontal direction of the first image data corresponding to the first picture, is associated with the first image data which has been obtained in the first photographing operation and stored in DRAM 21. On the monitoring display unit 2, the solid arrow AR1 representing the detected camera angle may be displayed over the image as shown in FIG. 4B, or may not be displayed.

After a second picture has been taken in the couple photographing mode, the angle sensor detects the angle of the digital camera 1 used to take the second picture at Step A05. Information representing the detected camera angle, which is used as indicating the horizontal direction of the second image data corresponding to the second picture, is associated with the second image data which has been obtained in the second t photographing operation and stored in DRAM 21. On the monitoring display unit 2, the solid arrow AR1 representing the detected camera angle may be displayed over the image as shown in FIG. 4D, or may not be displayed.

In the processes performed at Step A06 and thereafter, the information representing the camera angle are used as indicating the horizontal directions of the first and second image data.

In the digital camera according to the modified first embodiment, the user is not required to designate the horizontal direction of the image data on the touch panel 26 with his/her finger, and therefore images may be combined by a simple manipulation. To obtain images to be combined, it is enough for the user to take pictures without paying attention to the camera angle. Therefore, an easy-to-use digital camera is provided. The camera angle may be detected more precisely or more roughly depending on the precision of the angle-sensor.

Second Embodiment of the Invention

A digital still camera (hereafter, "digital camera") according to a second embodiment of the present invention will be described with reference to the accompanying drawings.

Figure 2:
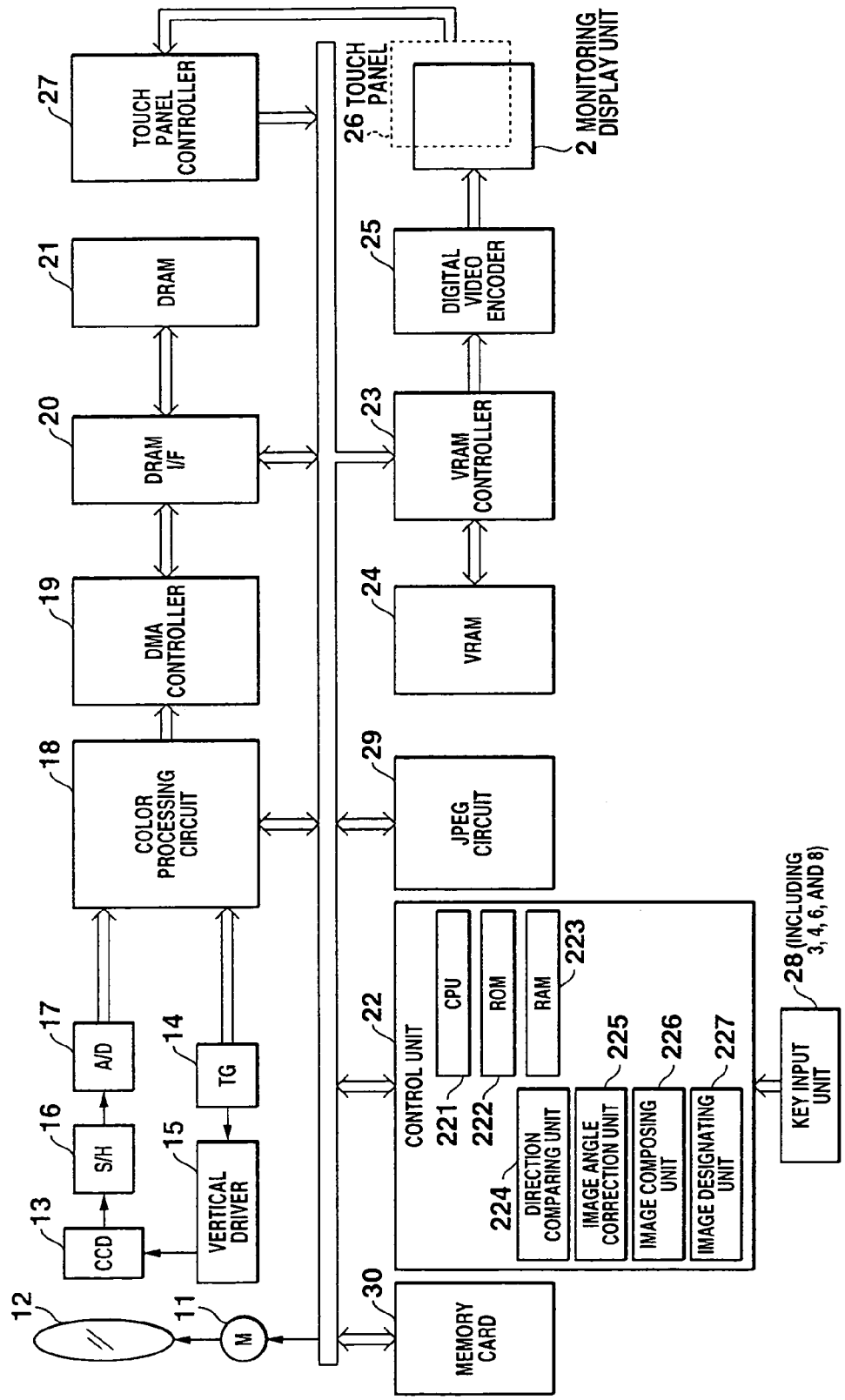
FIG. 2 is a block diagram showing a circuit configuration of the digital camera according to the first embodiment of the invention.

The digital camera of the second embodiment has a similar external view to the first embodiment shown in FIG. 1 and also has a similar circuit configuration to the first embodiment shown in FIG. 2. In the following description, like reference numerals will be used to refer to like or corresponding elements in the various figures, and the description and drawings thereof will be omitted.

Figure 6:
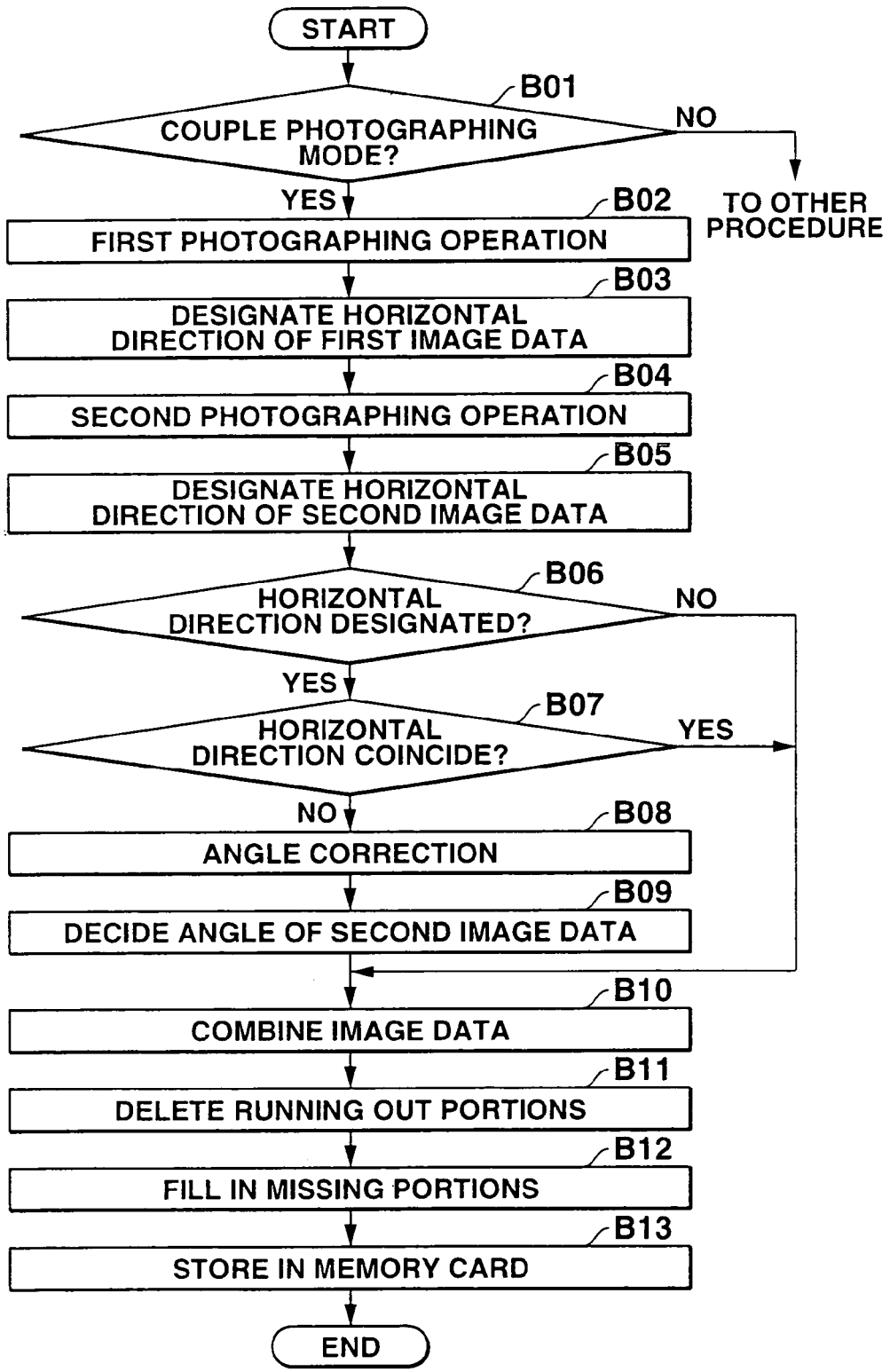
FIG. 6 is a flowchart showing a procedure in a couple photographing mode in a second embodiment of the invention.

Now, an operation of the digital camera of the second embodiment will be described with reference to the flowchart shown in FIG. 6.

At Step B01, it is judged whether the couple photographing mode has been set or not. If not, another photographing procedure is performed.

When it is determined at Step B01 that the couple photographing mode has been set, the first photographing operation is performed at Step B02. Image data (first image data) obtained during the first photographing operation is stored in DRAM 21. The first image data stored in the DRAM 21 is displayed on the monitoring display unit 2.

FIG. 4A is a view illustrating by way of example images displayed based on the first image data obtained during the first photographing operation on the monitoring display unit 2. More specifically, an image of a fixed subject "A" is displayed at the center of the display screen on the monitoring display unit 2, and an image of a person or a subject "B" is displayed on the right side of the display screen in the similar manner as shown in FIG. 9A.

To prompt the user to designate the horizontal direction of the image displayed on the monitoring display unit 2, a message saying, for example, "Designate the horizontal direction of the image" over the images displayed on the display screen in an overlapping manner. It may be possible to display a blinking arrow provisionally representing the horizontal direction of the image over the displayed image.

At Step B03 the user draws a line on the tough panel 26 with his/her finger to designate the horizontal direction of the first image data displayed on the monitoring display unit 2. The information representing the designated horizontal direction is associated with the first image data obtained during the first photographing operation and stored in DRAM 21.

As shown in FIG. 4B, a solid arrow AR1 representing the horizontal direction is displayed in the designated direction over the image.

Then, the second photographing operation is performed at Step B04. Since the first image data obtained during the first photographing operation is displayed in a semi-transparent state in a two third area on the right side of the display screen as shown in FIG. 4C, the second photographing operation is performed such that the real image of a subject and the semi-transparent image of the subject are overlapped.

The second image data obtained in the second photographing operation is store in a different memory area in DRAM 21 from the memory area where the first image data obtained in the first photographing operation has been stored, and the image data stored in DRAM 21 are displayed on the monitoring display unit 2.

While only the second image data obtained in the second photographing operation is displayed, for example, in a one third area on the left side of the display screen of the monitoring display unit 2, the user designates on the touch panel 26 the horizontal direction of the displayed image at Step B05. The information representing the designated horizontal direction of the image is associated with the second image data obtained in the second photographing operation, and is stored in DRAM 2.

Figure 4E:
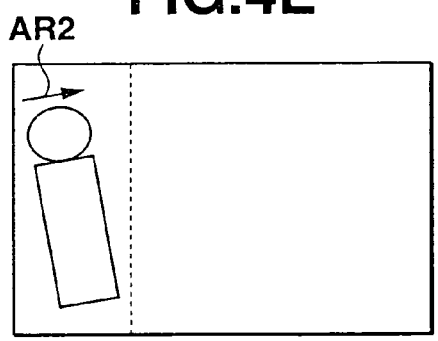

As shown in FIG. 4E, a solid arrow AR2 representing the designated horizontal direction of the image is displayed in the designated direction on the monitoring display unit 2.

Then, it is judged at Step B06 whether or not the information is associated with the image data stored in DRAM 21 to determine whether or not the horizontal directions of the images have been designated respectively with respect to the image data obtained in the two photographing operations.

Only when it is determined that the horizontal directions of the images have been designated, it is judged at Step B07 whether or not the two horizontal directions of the images coincide in direction with each other to determine whether or not an angle of the image, or a tilt of the image relative to the other image should be corrected.

When it is determined at Step B07 that the two horizontal directions of the images do not coincide with each other and that the angle of the image or the tilt of the image relative to the other image should be corrected, the angle correction procedure is performed at Step B08, where the second image data obtained in the second photographing operation is rotated to make the two horizontal directions of the images coincide with each other.

The angle correction procedure is performed manually by the user. For example, a guide message saying "Designate an angle of the image using "→" key or "←" key and decide the designated angle with the decision key" is displayed on the monitoring display unit 2 for receiving an input from the key input unit 28.

Every time the "→" key or "←" key included in the cross key 3 in the key input unit 28 is manipulated, the angle of the second image data (obtained in the second photographing operation) displayed on the monitoring display unit 2 is adjusted at Step B08.

For example, every operation of the "←" key turns the second image data by 5 degrees in the counter clockwise direction and every operation of the "→" key turns by 5 degrees in the clockwise direction. Therefore, the angle of the second image data can be adjusted according to the user's will on the monitoring display unit 2 by operation of these direction keys.

When the "→" key of the cross key3 is manipulated several times with the solid arrow AR2 displayed over the second image data as shown in FIG. 4E, the second image data is turned in the clockwise direction every time the key is operated as set forth above.

Figure 4F:
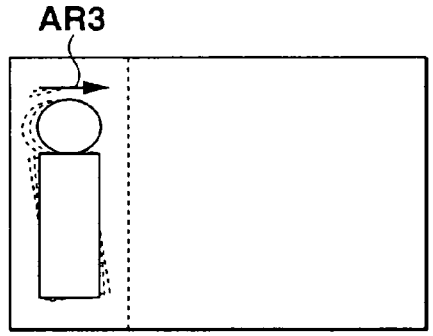

FIG. 4F is a view illustrating the second image data which is adjusted in its direction such that the arrow AR3 representing the horizontal direction of the second image data coincides with the arrow AR1 representing the horizontal direction of the first image data shown in FIG. 4B.

When the decision key 4 provided at the center of the cross key 3 is manipulated with the second image data adjusted in the angle as shown in FIG. 4F, the direction of the second image data is decided and the angle correction procedure finishes at Step B09.

At Step B10 an image composing process is performed to combine the first image data and the second image data with each other. The combined image data is subjected to the correcting process such that the portions running out of the image frame are deleted at Step B11 and the missing portions are filled in at Step B12, as set forth above.

The resultant image data is compressed in JPEG circuit 29 and stored in the memory card 30 at Step B13. Then, the photographing procedure is finished.

As described above, when the horizontal direction of each of the image data are designated on the touch panel 26 integrally provided on the monitoring display unit 2, and the designated horizontal directions do not coincide with each other in direction, the user can adjust at will the direction of one of the image data on the touch panel 26 such that both the horizontal directions of the image data coincide with each other in direction, and therefore the resultant image data producing no unnatural feeling can be obtained.

Third Embodiment of the Invention

A digital camera according to a third embodiment of the invention will be described with reference to the accompanying drawings.

The external view of the digital camera of the third embodiment is substantially same as the first embodiment shown in FIG. 1, and the digital camera also has substantially same circuit configuration shown in FIG. 2. In the following description, like reference numerals will be used to refer to like or corresponding elements in the various figures, and the further description and drawings thereof will be omitted.

Figure 7:
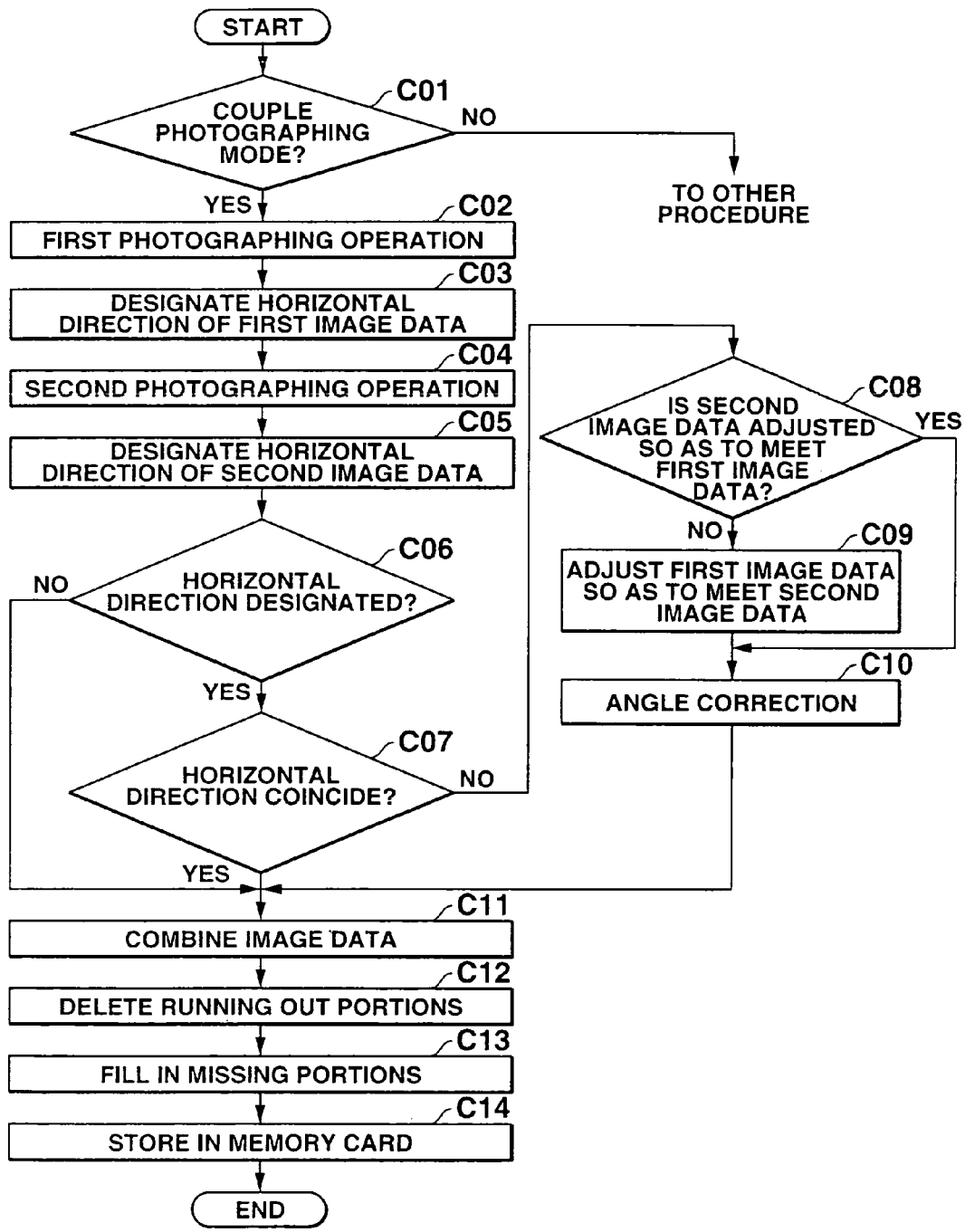
FIG. 7 is a flowchart showing a procedure in a couple photographing mode in a third embodiment.

Now, an operation of the digital camera of the third embodiment will be described with reference to the flow chart shown in FIG. 7.

At Step C01, it is judged whether the couple photographing mode has been set or not. If not, another photographing procedure is performed.

When it is determined at Step C01 that the couple photographing mode has been set, the first photographing operation is performed to obtain an image for the center and right side portion of the display screen at Step C02. The first image data obtained in the first photographing operation is stored in the DRAM 21 and displayed on the monitoring display unit 2.

To prompt the user to designate the horizontal direction of the image displayed on the monitoring display unit 2, a message saying, for example, "Designate the horizontal direction of the image" over the images displayed on the display screen in an overlapping manner. It may be possible to display a blinking arrow provisionally representing the horizontal direction of the image over the displayed image.

At Step C03 the user draws a line on the tough panel 26 with his/her finger to designate the horizontal direction of the first image data displayed on the monitoring display unit 2. The information representing the designated horizontal direction of the first image data is associated with the first image data and stored in DRAM 21.

Thereafter, the second photographing operation is performed to obtain imaged data for the left one third area of the display screen at Step C04.

At this time, since the first image data is displayed in a semi-transparent state on the right two-thirds area of the display screen, the user can determine the camera angle in the second photographing operation so that the subject to be photographed will occupy the left one-third area of the display screen.

The second image data obtained in the above mentioned way in the second photographing operation is stored in a different memory area in DRAM 21 from the memory area where the first image data obtained in the first photographing operation has been stored, and the image data stored in DRAM 21 are displayed on the monitoring display unit 2.

The user designates the horizontal direction of the second image data on the touch panel 26 with his/her finger at Step C05 while only the second image data is displayed in the left one third area of the monitoring display unit 2.

The information representing the horizontal direction of the second image data is associated with the second image data in DRAM 21, and a solid arrow AR2 representing the horizontal direction of the second image data is displayed over the second image data displayed on the monitoring display unit 2.

Then, it is judged at Step C06 whether or not the information is associated with the image data stored in DRAM 21 to determine whether or not the horizontal directions of images have been designated with respect to the image data obtained in the two photographing operations respectively.

Only when it is determined that the horizontal directions of the images have been designated, it is judged at Step C07 whether or not the two horizontal directions of the images coincide in direction with each other to determine whether or not an angle of the image or a tilt of the image relative to the other image should be corrected.

When it is determined at Step C07 that the two horizontal directions of the images do not coincide with each other and that the angle of the image should be corrected, it is judged at Step C08, whether or not the angle correction procedure is performed, where the second image data obtained in the second photographing operation is rotated to make the two horizontal directions of the images meet with each other.

Judgment at Step C08 is performed as follows. For example, a guide message saying "Correct the angle of the image? YES→Decision key/NO→Shutter key" is displayed over the arrow representing the horizontal direction of the second image data displayed on the monitoring display unit 2. Then, it is judged whether or not either of the Decision key and the Shutter key is manipulated to determine whether or not the angle of the second image data is corrected with respect to the first image data.

If the second image is to be adjusted in direction with respect to the first image data, an initially set condition is not changed. When the shutter key is manipulated, the initially set condition is changed at Step C09 so that the first image data is adjusted in direction with respect to the second image data.

Then, the angle correction procedure is performed at Step C10 and one of the image data is turned so that the horizontal direction thereof coincides with that of the other image data.

Then, the arranged image data and the other image data are combined at Step C11.

The portion of the combined image data which runs out of the frame is deleted at Step C12, and the missing portion of the combined image data is filled in with data of the neighbor portion in at Step C13.

The resultant image data is compressed in JPEG circuit 29 and stored in the memory card 30 at Step C14. Now, all the processes in the couple photographing mode finish.

As described above, since the user can select the image data, the direction or angle of which is to be arranged or corrected with respect to the other image data, the resultant image data is obtained with the more important image data not adjusted or corrected.

Forth Embodiment of the Invention

A digital camera according to a forth embodiment of the invention will be described with reference to the accompanying drawings.

The external view of the digital camera of the third embodiment is substantially same as the first embodiment shown in FIG. 1, and the digital camera also has substantially same circuit configuration shown in FIG. 2. In the following description, like reference numerals will be used to refer to like or corresponding elements in the various figures, and the further description and drawings thereof will be omitted.

Figure 8:
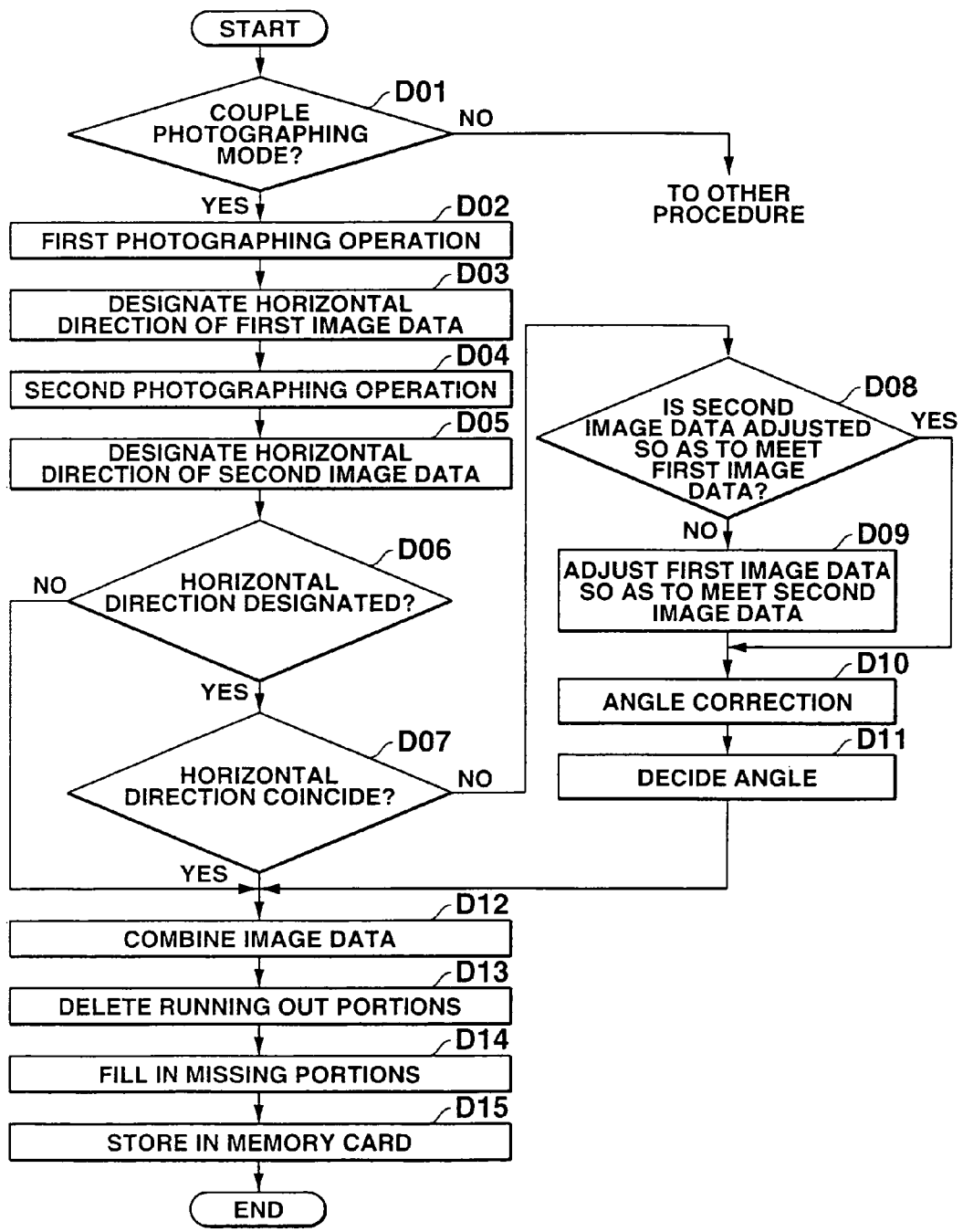
FIG. 8 is a flowchart showing a procedure in a couple photographing mode in a third embodiment.

Now, an operation of the digital camera of the forth embodiment will be described with reference to the flowchart shown in FIG. 8.

At Step D01, it is judged whether the couple photographing mode has been set or not. If not, another photographing procedure is performed.

When it is determined at Step D01 that the couple photographing mode has been set, the first photographing operation is performed to obtain an image to be displayed in the center and right side portion of the display screen at Step D02. The first image data obtained in the first photographing operation is stored in the DRAM 21 and displayed on the monitoring display unit 2.

To prompt the user to designate the horizontal direction of the image displayed on the monitoring display unit 2, a message saying, for example, "Designate the horizontal direction of the image" over the images displayed on the display screen in an overlapping manner. It may be possible to display a blinking arrow provisionally representing the horizontal direction of the image over the displayed image.

At Step D03 the user draws a line on the tough panel 26 with his/her finger to designate the horizontal direction of the first image data displayed on the monitoring display unit 2. The information representing the designated horizontal direction of the first image data is associated with the first image data and stored in DRAM 21.

Thereafter, the second photographing operation is performed to obtain imaged data to be displayed in the left one third area of the display screen at Step D04.

At this time, since the first image data is displayed in a semi-transparent state on the right two third area of the display screen, the user can determine the camera angle in the second photographing operation so that the subject to be photographed will occupy the left one third area of the display screen.

The second image data obtained in the above mentioned way in the second photographing operation is stored in a different memory area in DRAM 21 from the memory area where the first image data obtained in the first photographing operation has been stored, and the image data stored in DRAM 21 are displayed on the monitoring display unit 2.

The user designates the horizontal direction of the second image data on the touch panel 26 with his/her finger at Step D05 while only the second image data is displayed in the left one third area of the monitoring display unit 2.

The information representing the horizontal direction of the second image data is associated with the second image data in DRAM 21, and a solid arrow AR2 representing the horizontal direction of the second image data is displayed over the second image data displayed on the monitoring display unit 2.

Then, it is judged at Step C06 whether or not the information is associated with the image data stored in DRAM 21 to determine whether or not the horizontal directions of images have been designated with respect to the image data obtained in the two photographing operations respectively.

Only when it is determined that the horizontal directions of the images have been designated, it is judged at Step D07 whether or not the two horizontal directions of the images coincide in direction with each other to determine whether not angles of the images should be corrected.

When it is determined at Step D07 that the two horizontal directions of the images do not coincide with each other and that the angles of the images should be corrected, it is judged at Step D08, whether or not the angle correction procedure is performed, where the second image data obtained in the second photographing operation is rotated to make the two horizontal directions of the images meet with each other.

Judgment at Step D08 is performed as follows. For example, a guide message saying "Correct the angle of the image? YES→Decision key/NO→Shutter key" is displayed over the arrow representing the horizontal direction of the second image data displayed on the monitoring display unit 2. Then, it is judged whether or not either of the Decision key and the Shutter key is manipulated to determine whether or not the angle of the second image data or a tilt of the image data relative to the other image data is corrected with respect to the first image data.

If the second imaged is adjusted in direction with respect to the first image data, an initially set condition is not changed. But when the shutter key is manipulated, the initially set condition is changed at Step D09 so that the first image data is adjusted in direction with respect to the second image data.

Then, the angle correction procedure is performed at Step D10 and one of the image data is turned so that the horizontal direction thereof coincides with that of the other image data.

The angle correction procedure is performed manually by the user. For example, a guide message saying "Designate an angle of the image using "→" key or "←" key and decide the designated angle with the decision key" is displayed on the monitoring display unit for receiving an input from the key input unit 28.

Every time the "→" key or "←" key included in the cross key 3 in the key input unit 28 is manipulated, the angle of the image data to be corrected and displayed on the monitoring display unit 2 is corrected at Step D08.

For example, every operation of the "←" key turns the second image data by 5 degrees in the counter clockwise direction and every operation of the "→" key turns by 5 degrees in the clockwise direction. Therefore, the angle of the image data can be corrected according to the user's will on the monitoring display unit 2 by operation of these direction keys.

When the decision key 4 provided at the center of the cross key 3 is manipulated with the image data adjusted in the angle, the direction of the image data is decided finally and the angle correction procedure finishes at Step D11.

At Step D12 an image composing process is performed to combine the first image data and the second image data with each other.

The combined image data is subjected to the correcting process such that the portions running out of the image frame are deleted at Step D13 and the missing portions are filled in with data of the neighbor portion at Step D14.

The resultant image data is compressed in JPEG circuit 29 and stored in the memory card 30 at Step D15. Then, the photographing procedure is finished.

As described above, when the horizontal direction of each of the image data are designated on the touch panel 26 integrally provided on the monitoring display unit 2, and the designated horizontal directions do not coincide with each other in direction, the user can select the image data, the direction or angle of which is to be adjusted or corrected with respect to the other image data, and can adjust or correct at will the direction of the selected image data on the touch panel 26 such that both the horizontal directions of the image data coincide with each other in direction.

Therefore, the resultant image data producing no unnatural feeling can be obtained with the more important image data not adjusted or corrected.

In the first embodiment through the forth embodiment of the invention set forth above, a line is drawn over the displayed image by the user with his/her finger to designate the horizontal direction of the images, but another line may be drawn to designate a vertical direction of the image in place of the horizontal direction.

Another method may be employed to determine the direction of image data. In this method, arrows radiating in eight or sixteen directions are displayed over the displayed image, and the user selects one of the arrows, for instance, an arrow extending in the vertical direction on the touch panel to designate the top of the image.

It may be also possible to designate the horizontal direction of image data to be combined using the direction key.

If the cross key 3 has skew keys in addition to or between the upward-direction key, the downward-direction key, the leftward-direction key, the rightward-direction key and the decision key, eight directions may be designated using such cross key 3. Using the cross key, the user can designate the direction of the image data to be combined.

In the embodiments set forth above, the image data to be displayed in the right two-thirds area of the display screen is obtained in the first photographing operation and the image data for the remaining left one third area of the display screen is obtained in the second photographing operation. But it may be possible to obtain image data for a right half area of the display screen in the first photographing operation and image data for the left half area in the second photographing operation. Further, the display area for the first and second image data may be divided in various ratios, for example, the one third area of the display screen area may be assigned for the first image data and the two third area for the second image data.

In the second and forth embodiments, the angle of the image data is adjusted by the user's manipulation of the key, but the angle of the image data may be adjusted fine by the key manipulation after the angle of the image data has been automatically adjusted so that the horizontal directions of the both image data coincide with each other.

It may be applied to the second through forth embodiments to use the angle sensor to detect the angle of the digital camera to designate the horizontal directions of the image data, as described in the modified first embodiment.

Further modification and variation can be made to the disclosed embodiments without departing from the subject and spirit of the invention as defined in the following claims. Such modification and variations, as included within the scope of these claims, are meant to be considered part of the invention as described.

The invention claimed is:

1. An image pickup apparatus comprising:
  a storage device for storing first image data and second image data obtained respectively in a first photographing operation and a second photographing operation;
  a first direction-designating unit for designating a direction for the first image data stored in the storage device;
  a second direction-designating unit for designating a direction for the second image data stored in the storage device;
  a direction-comparing unit for comparing the directions designated respectively for the first image data and the second image data;
  an image-angle correcting unit for adjusting a tilt of at least one of the first and the second image data depending on a comparison result produced by the direction-comparing unit so that the directions of the first image data and the second image data are made to coincide;

an image composing unit for combining the first image data and the second image data, as adjusted by the image-angle correcting unit; and an image designating unit for designating one of the first image data and the second image data, wherein the image-angle correcting unit corrects the tilt of the image data designated by the image designating unit so that the direction of the designated image data coincides with the direction of the other image data.

2. An image pickup apparatus comprising:

a storage device for storing first image data and second image data obtained respectively in a first photographing operation and a second photographing operation;

a first direction-designating unit for designating a direction for the first image data stored in the storage device;

a second direction-designating unit for designating a direction for the second image data stored in the storage device;

a direction-comparing unit for comparing the directions designated respectively for the first image data and the second image data;

an image-angle correcting unit for adjusting a tilt of at least one of the first and the second image data depending on a comparison result produced by the direction-comparing unit so that the directions of the first image data and the second image data are made to coincide;

an image composing unit for combining the first image data and the second image data, as adjusted by the image-angle correcting unit; and wherein the image-angle correcting unit corrects the tilt of at least one of the first image data and the second image data by an arbitrary angle.

3. An image pickup apparatus comprising:

a storage device for storing first image data and second image data obtained respectively in a first photographing operation and a second photographing operation;

a touch panel which is operable as a first direction-designating unit to designate a direction for the first image data stored in the storage device, and which is operable as a second direction-designating unit to designate a direction for the second image data stored in the storage device;

a direction-comparing unit for comparing the directions designated respectively for the first image data and the second image data;

an image-angle correcting unit for adjusting a tilt of at least one of the first and the second image data depending on a comparison result produced by the direction-comparing unit so that the directions of the first image data and the second image data are made to coincide;

an image composing unit for combining the first image data and the second image data, as adjusted by the image-angle correcting unit; and wherein the touch panel designates the direction of the first image data and the direction of the second image data using coordinates which represent positions on the touch panel where a user touches.

4. An image pickup apparatus comprising:

a storage device for storing first image data and second image data obtained respectively in a first photographing operation and a second photographing operation;

a first direction-designating unit for designating a direction for the first image data stored in the storage device;

a second direction-designating unit for designating a direction for the second image data stored in the storage device;

a direction-comparing unit for comparing the directions designated respectively for the first image data and the second image data;

an image-angle correcting unit for adjusting a tilt of at least one of the first and the second image data depending on a comparison result produced by the direction-comparing unit so that the directions of the first image data and the second image data are made to coincide;

an image composing unit for combining the first image data and the second image data, as adjusted by the image-angle correcting unit; and wherein the first direction-designating unit and the second direction-designating unit comprise key buttons and designate a direction based on a direction of a depressed at least one of the key buttons.

5. A photographing method comprising:

a) storing in a storage device first image data and second image data obtained respectively in a first photographing operation and a second photographing operation;

b) designating a direction for the first image data stored in the storage device;

c) designating a direction for the second image data stored in the storage device;

d) comparing the directions designated respectively for the first image data and the second image data;

e) adjusting a tilt of one of the first image data and the second image data depending on a comparison result of the comparison so that the directions of the first image data and the second image data are made to coincide;

f) combining the first image data and the second image data, as adjusted; and g) designating one of the first image data and the second image data, wherein the tilt of the designated image data is corrected so that the direction of the designated image data coincides with the direction of the other image data.

6. A photographing method comprising:

a) storing in a storage device first image data and second image data obtained respectively in a first photographing operation and a second photographing operation;

b) designating a direction for the first image data stored in the storage device;

c) designating a direction for the second image data stored in the storage device;

d) comparing the directions designated respectively for the first image data and the second image data;

e) adjusting a tilt of one of the first image data and the second image data depending on a comparison result of the comparison so that the directions of the first image data and the second image data are made to coincide; and f) combining the first image data and the second image data, as adjusted;

wherein the tilt of at least one of the first image data and the second image data is corrected by an arbitrary angle.

7. A computer-readable storage medium having recorded thereon a computer readable program for controlling a control unit of a camera to perform functions of:

a) storing in a storage device first image data and second image data obtained respectively in a first photographing operation and a second photographing operation;

b) designating a direction for the first image data stored in the storage device;

c) designating a direction for the second image data stored in the storage device;

d) comparing the directions designated respectively for the first image data and the second image data;

e) adjusting a tilt of one of the first image data and the second image data depending on a comparison result of the comparison so that the directions of the first image data and the second image data are made to coincide;

f) combining the first image data and the second image data, as adjusted; and g) designating one of the first image data and the second image data, wherein the tilt of the designated image data is corrected so that the direction of the designated image data coincides with the direction of the other image data.

8. A computer-readable storage medium having recorded thereon a computer readable program for controlling a control unit of a camera to perform functions of:

a) storing in a storage device first image data and second image data obtained respectively in a first photographing operation and a second photographing operation;

b) designating a direction for the first image data stored in the storage device;

c) designating a direction for the second image data stored in the storage device;

d) comparing the directions designated respectively for the first image data and the second image data;

e) adjusting a tilt of one of the first image data and the second image data depending on a comparison result of the comparison so that the directions of the first image data and the second image data are made to coincide; and f) combining the first image data and the second image data, as adjusted;

wherein the tilt of at least one of the first image data and the second image data is corrected by an arbitrary angle.

* * * * *